US012801568B2

(12) United States Patent
Sanchez et al.

(10) Patent No.: US 12,801,568 B2
(45) Date of Patent: Nov. 17, 2026

(54) MAINTAINING METADATA FROM A CATALOG IN A REPOSITORY TO RETURN TO REQUESTS FOR THE METADATA

(71) Applicant: International Business Machines Corporation, Armonk, NY (US)

(72) Inventors: Issak Sanchez, Tucson, AZ (US); Franklin E. McCune, Tucson, AZ (US); David C. Reed, Tucson, AZ (US); Eric Harris, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 17/475,311

(22) Filed: Sep. 14, 2021

(65) Prior Publication Data

US 2023/0083798 A1 Mar. 16, 2023

(51) Int. Cl.
*G06F 16/14* (2019.01)
*G06F 16/16* (2019.01)

(52) U.S. Cl.
CPC .......... *G06F 16/148* (2019.01); *G06F 16/164* (2019.01)

(58) Field of Classification Search
None
See application file for complete search history.

(56) References Cited

U.S. PATENT DOCUMENTS 7,103,714 B1 * 9/2006 Jacobs ................ G06F 16/9574 709/228
8,024,519 B2 9/2011 Lehr et al.
8,918,400 B2 12/2014 Belisle et al.
9,286,303 B1 * 3/2016 Cohen ................. G06F 16/2228
9,740,579 B2 8/2017 Hegde et al.
9,852,076 B1 * 12/2017 Garg ..................... G06F 16/172
10,417,243 B1 9/2019 Singh et al.
10,606,802 B2 3/2020 Erdmann et al.
2005/0246487 A1 * 11/2005 Ergan .................. G06F 12/0866 711/135
2007/0088769 A1 4/2007 Pace et al.
2009/0089340 A1 * 4/2009 Ohr ..................... G06F 11/1662
2011/0119228 A1 * 5/2011 Menze ................ G06F 12/0888 711/137

(Continued)

FOREIGN PATENT DOCUMENTS

CN 107861842 A 3/2018

*Primary Examiner* — Ann J Lo
(74) *Attorney, Agent, or Firm* — CHIP LAW GROUP

(57) ABSTRACT

Provided are a computer program product, system, and method for maintaining metadata from a catalog in a repository to return to requests for the metadata. A first instance of a request for metadata from a catalog of metadata on data sets is intercepted from an application and the metadata is retrieved from the catalog and saved in a repository. The retrieved metadata is associated with the request in the repository. The metadata retrieved from the catalog is returned to the application for the first instance of the request. A second instance of the request is intercepted from the application. A determination is made whether to fulfill the second instance of the request from the repository. The metadata for the second instance of the request is retrieved from the repository in response to determining to fulfill the second instance of the request from the repository.

20 Claims, 5 Drawing Sheets

(56) References Cited

U.S. PATENT DOCUMENTS

| | | | | |
|---|---|---|---|---|
| 2011/0225141 | A1* | 9/2011 | Chaudhry | G06F 11/1469 707/827 |
| 2012/0210068 | A1* | 8/2012 | Joshi | G06F 9/45558 711/E12.017 |
| 2017/0185619 | A1* | 6/2017 | Choubey | G06F 16/172 |
| 2017/0199821 | A1* | 7/2017 | Kasten | G06F 16/40 |
| 2017/0286463 | A1 | 10/2017 | Witt | |

* cited by examiner

MAINTAINING METADATA FROM A CATALOG IN A REPOSITORY TO RETURN TO REQUESTS FOR THE METADATA

BACKGROUND OF THE INVENTION

1. Field of the Invention

The present invention relates to a computer program product, system, and method for maintaining metadata from a catalog in a repository to return to requests for the metadata.

2. Description of the Related Art

In certain storage environments, critical applications require access to metadata on data sets, such as their configuration and format, that is needed to access data in the data sets. These critical applications may access metadata from catalogs to obtain the information needed to access data sets for operations, such as location in storage, allocated volumes and extents, format, etc. A critical application may not be able to load or continue operations if it cannot access metadata for critical data sets.

There is a need in the art for providing improved techniques to return metadata to applications that is needed for the applications to access data sets and function properly.

SUMMARY

Provided are a computer program product, system, and method for maintaining metadata from a catalog in a repository to return to requests for the metadata. A first instance of a request for metadata from a catalog of metadata on data sets configured in the storage is intercepted from an application. The metadata for the request is retrieved from the catalog. The metadata returned from the catalog to the request is saved in a repository. The retrieved metadata is associated with the request in the repository. The metadata retrieved from the catalog is returned to the application for the first instance of the request. A second instance of the request is intercepted from the application. A determination is made whether to fulfill the second instance of the request from the repository. The metadata for the second instance of the request is retrieved from the repository in response to determining to fulfill the second instance of the request from the repository.

DETAILED DESCRIPTION

Storage systems may maintain metadata having configuration information on data sets configured in storage, such as location, allocated volumes and extents for the data sets, in a catalog. Application requests for metadata may be serviced from the catalog. When a catalog of metadata is damaged or inaccessible, such as during a hardware or software failure, applications will not have the necessary metadata needed to access data sets to initialize, and may fail to start. Further, for certain critical applications, the entire system may fail if the critical application cannot access the metadata on data sets that is needed to access critical data in the data sets. Such application failure can have significant operational and financial impacts on system users.

Described embodiments provide improvements to computer technology for returning data set metadata to application requests for the metadata by providing a repository that stores metadata returned from the catalog for a request type, data set, and application. After this metadata is added to the repository for a request type, data set, subsystem including the data set, and application, future requests of that same request type, to the same data set and from the same application may be returned from the repository if the catalog is damaged or unavailable. This allows the application to continue critical operations that require the requested metadata to initialize or otherwise continue to operate.

Figure 1:
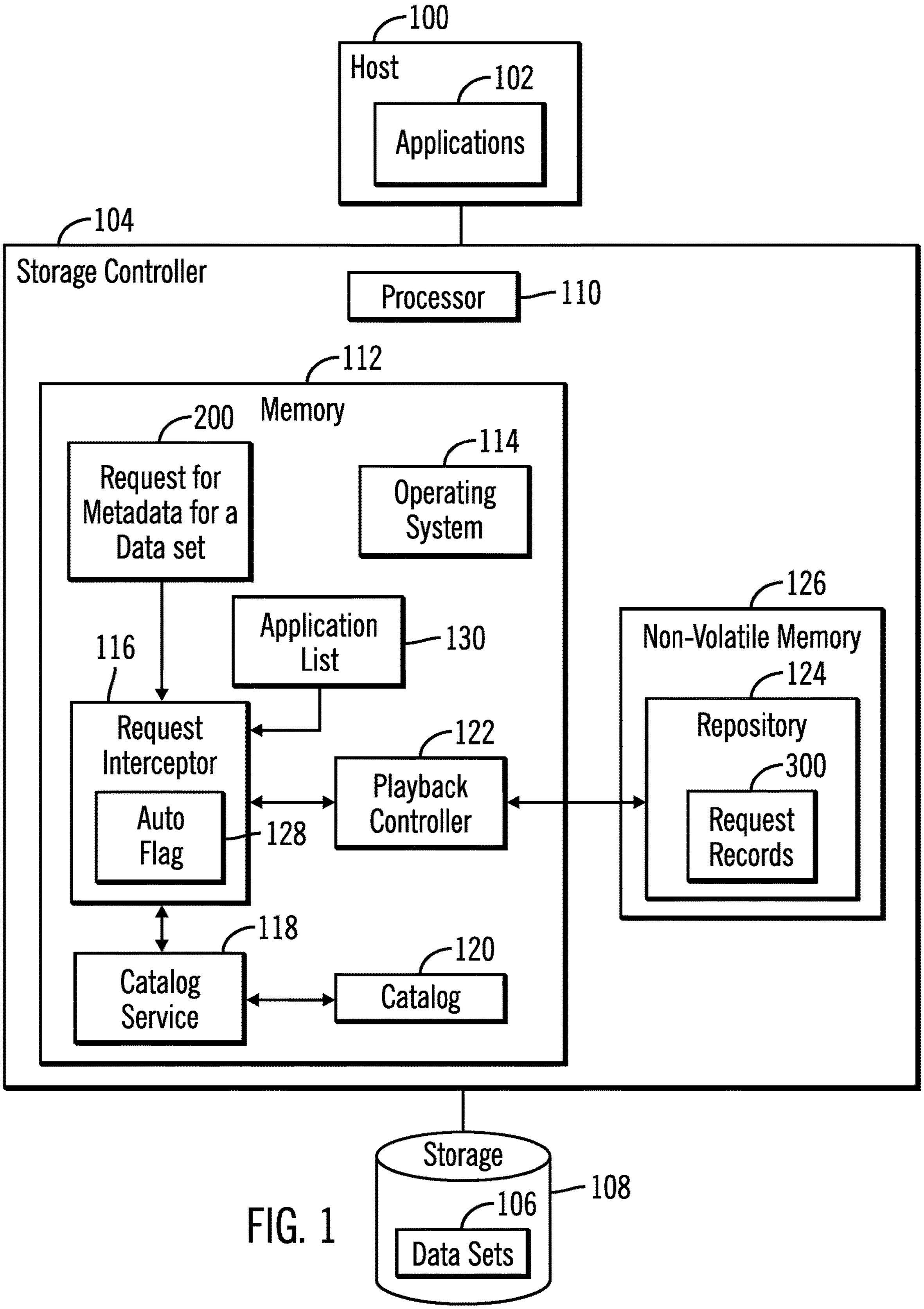
FIG. 1 illustrates an embodiment of a storage environment.

FIG. 1 illustrates an embodiment of a data storage environment having a host system 100 that includes applications 102 to submit requests for metadata for data sets to a storage controller 104, also referred to as an enterprise storage server, managing access to data sets 106 in a storage 108. The storage controller 104 manages access to the data sets 106 and may communicate with the storage 108 and hosts 100 over a network, bus interface, or other type of interface.

The storage controller 104 includes a memory 112 storing programs executed by the processor 110, including an operating system 114 to process read and write requests from the applications 102, executing in the host 100 or another system connected to the host 100; a request interceptor 116 to intercept a request for metadata 200 from a host application 102 before they are processed by the operating system 114 or a catalog service 118 managing access to a catalog 120 having metadata for data sets 106 in the storage 108, such as information on extents and volumes configured in the data sets 106; and a playback controller 122 to receive from the request interceptor 116 intercepted requests 200 and updates to the catalog 120 from the host applications 102 and save and retrieve metadata for the requests in request records 300 stored in a repository 124 in a non-volatile memory 126, to allow for the request records 300 to be retained through system 104 power cycles.

The request interceptor 116 includes an auto-flag 128 that indicates whether the request interceptor 116 should save metadata for requests in the repository 124 and return metadata from the repository 124 if the submission of the request 200 to the catalog service 118 fails. The auto flag 128 may be set by a program, such as if the request interceptor 116 receives a failure from the catalog service 118 due to corruption or failure in the catalog 120 or in response to user input to change the auto flag 128. The auto flag 128 may remain "on" during the time a catalog 120 is damaged and repaired, and remain "on" after the catalog 120 is repaired to save updates to the catalog 120 and requested metadata in the repository 124 for future catalog 120 failures or unavailability. The user may decide whether the auto-flag should remain "on" or "off" based on the system needs, such as if they decide the benefits of maintaining the playback controller 122 operational exceeds the cost of additional overhead needed to operate the playback controller 122.

The memory 112 further maintains an application list 130 indicating host applications 102 that participate in receiving metadata from the playback controller 122 through the repository 124. An administrator may indicate critical applications in the application list 130 for which metadata is returned from the repository 124 so that only requests for critical applications indicated in the list 130 are intercepted to determine whether to bypass the catalog 120 to retrieve from the repository 124.

The catalog 120 has metadata including information on the configuration of the data sets 106, including volumes and extents allocated to the data sets 106, subsystem of the data sets 106, format, etc. A data set may comprise a portion of a logical storage device or volume, such as a range of tracks, database blocks, etc., and may be comprised of smaller units of data, such as extents, tracks, etc., that are allocated to data sets or files.

The storage 108 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The data sets 122, 124 may further be configured from an array of devices, such as Just a Bunch of Disks (JBOD), Direct Access Storage Device (DASD), Redundant Array of Independent Disks (RAID) array, virtualization device, etc.

The non-volatile memory 126 may comprise a suitable non-volatile memory device, such as an SSD, SRAM, battery backed-up RAM, etc., and others described above.

Generally, program modules, such as the program components 114, 116, 122, and 118 may comprise routines, programs, objects, components, logic, data structures, and so on that perform particular tasks or implement particular abstract data types. The program components of FIG. 1 may be implemented in one or more computer systems, where if they are implemented in multiple computer systems, then the computer systems may communicate over a network The programs 114, 116, 122, and 118 may comprise program code loaded into memory and executed by a processor. Alternatively, some or all of the functions may be implemented in hardware devices, such as in Application Specific Integrated Circuits (ASICs) or executed by separate dedicated processors.

In certain implementations, the host 100 may implement an operating system, such as the International Business Machines Corporation ("IBM") Z/OS® operating system and the storage controller 104 may comprise an enterprise storage controller or server, such as the IBM DS8000™ storage controller. (Z/OS and DS8000 are registered trademarks of IBM throughout the world). The requests 200 for metadata from the catalog may comprise a supervisor call instruction (SVC) routine used in the Z/OS operating system.

In FIG. 1, arrows are shown between components. These arrows represent information flow to and from the program components and do not represent data structures.

Figure 2:
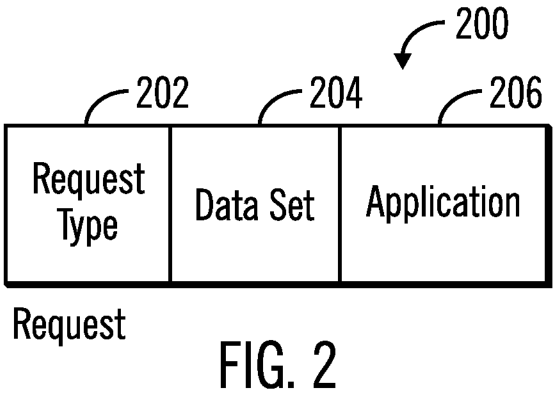
FIG. 2 illustrates an embodiment of a request for metadata.
Figure 3:
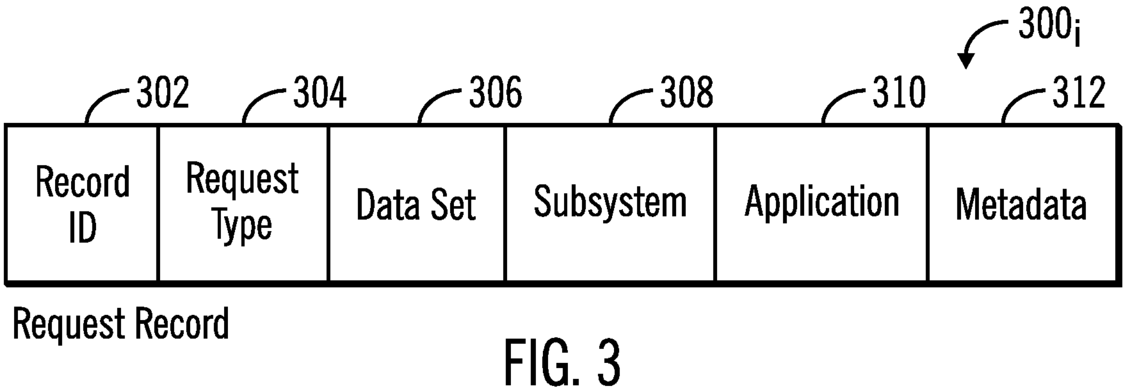
FIG. 3 illustrates an embodiment of a request record in a repository to maintain metadata from the catalog to return to requests for the metadata.

FIG. 2 illustrates an embodiment of a request 200 from the host application 102 for metadata from the catalog 120, and may include: a request type 202 or operation code identifying the specific command request for metadata; a data set 204 for which the metadata is requested; and an identify of the application 206 submitting the request 200, such as a database application, initial program load (IPL) routine, transaction processing subsystem of the host 100, time sharing option to allow multiple users to share resources of the storage controller 108, etc.;

FIG. 3 illustrates an embodiment of an instance of a request record 300$_i$ maintained in the repository 124 to store metadata returned to a request 200, and may include a record identifier (ID) 302; a request type 304 of the request 200 for which the metadata was returned, which may be indicated in the request type 202 of the request 200; a data set 306 for which the metadata is requested, which may be indicated in field 204 of the request 200; a subsystem 308 in which the data set 306 is maintained; an application 310 that submitted the request 200, which may be indicated in field 206 in the request 200; and the metadata 312 retrieved from the catalog 120 for the request 200.

With the embodiment of FIG. 3, metadata is associated with a request type 304, data set 306, subsystem 308, and application 310, such that requests having differences in request type, data set, application and/or subsystem may be maintained in separate request records 300$_i$. In this way, if a data set is found in multiple subsystems and used for different applications, and returned for different request types, then different request records 300$_i$ are used to store the metadata returned for different request types/data set/application/subsystems. Further, the metadata returned for one request type may differ from metadata for a different request type, and the metadata 312 stored may only include that work area from the catalog 120 that was returned for the particular request type, not the entire metadata.

Figure 4:
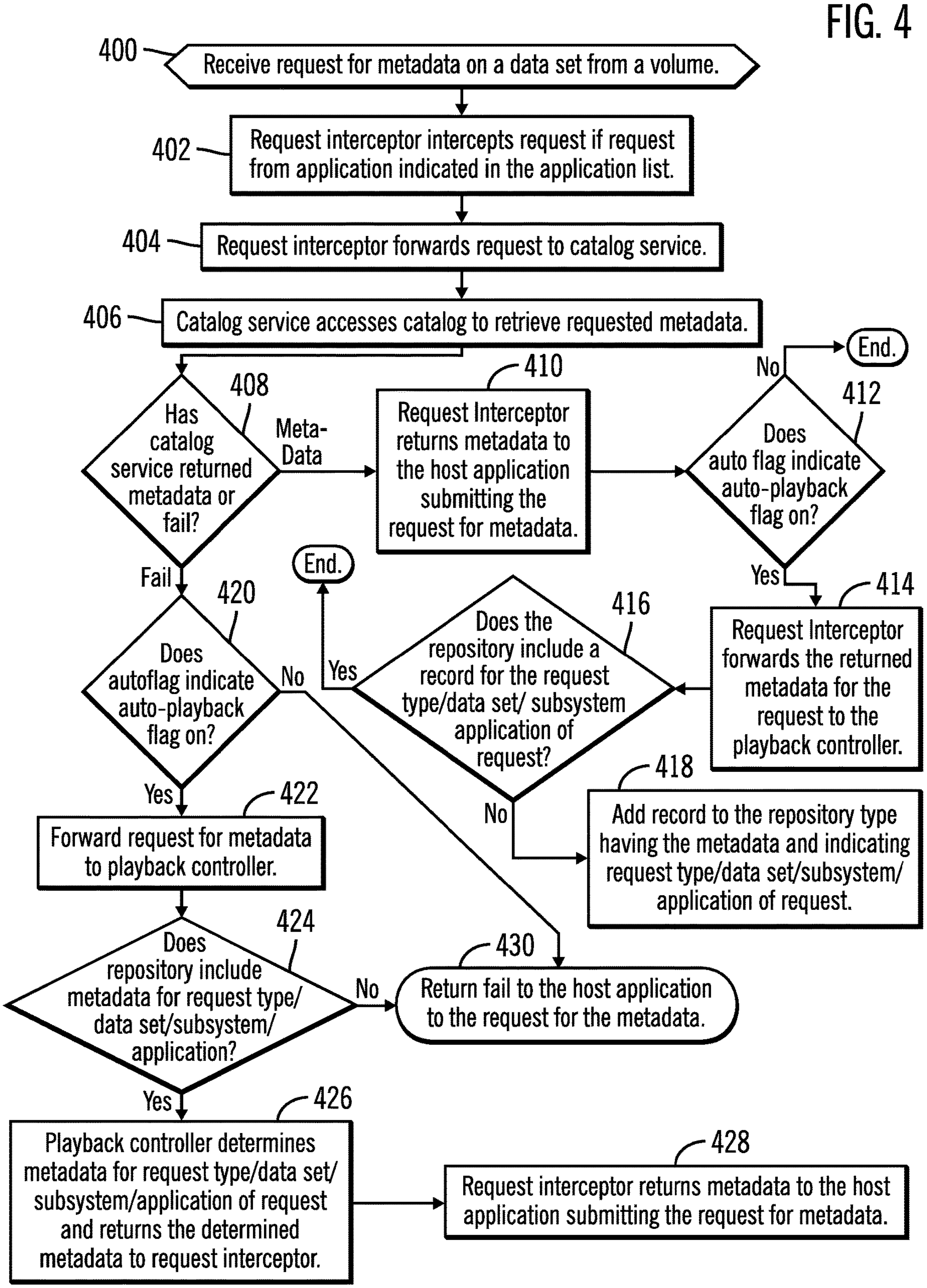
FIG. 4 illustrates an embodiment of operations to retrieve metadata for a request for metadata from a catalog service or a playback controller which returns metadata from a repository to bypass the catalog

FIG. 4 illustrates an embodiment of operations performed by the request interceptor 116, catalog service 118, and playback controller 122 to process a request for metadata 200 from a host application 102. Upon the storage controller 108 receiving (at block 400) a request for metadata 200 from a host application 102, the request interceptor 116 intercepts (at block 402) the request 200 before it reaches the catalog service 118 if the request 200 is from an application 206 indicated in the application list 130. If the application 206 submitting the request 200 is not indicated in the application list, then the request 200 proceeds to the catalog service 118. The request interceptor 116 forwards (at block 404) the request 200 to the catalog service 118. The catalog service 118 accesses (at block 406) the catalog 120 to retrieve the requested metadata for the request 200 and then returns the requested metadata or returns a fail message. If (at block 408) the requested metadata is returned from the catalog 120, then the request interceptor 116 returns (at block 410) the metadata from the catalog 120 to the host application 102 submitting the request for metadata 200.

If (at block 412) the auto flag 128 indicates that auto-playback is "on" or active, then the request interceptor 116 may forward (at block 414) the returned metadata 312 for the request 200 to the playback controller 122. If (at block 416) the playback controller 122 determines that the repository 124 does not include a record 300$_i$ for the request type/data set/subsystem/application of the request 200, then the playback controller 122 adds (at block 418) a record 300$_i$ to the repository 124 to retain the most current version of the metadata for the request type/data set/subsystem/application for the request 200. If (at block 428) there already is a record 300$_i$ in the repository 124, then control ends. If (at block 412) the auto-flag is "off" indicating the playback controller 122 is inactive, then control ends.

If (at block 408) the catalog service 118 returns fail in response to the request for metadata and if (at block 420) the auto flag 128 indicates auto playback is "on", then the request interceptor 116 forwards (at block 422) the request 200 to the playback controller 122. If (at block 424) the repository 124 includes a request record 300$_i$ having metadata for the request type/data set/subsystem/application to which the request 200 is directed, then the playback controller 122 determines (at block 426) metadata 312 in the request record 300$_i$ for the request type 304/data set 306/ subsystem 308/application 310 indicated in the request 200 and returns the stored metadata 312 to the request interceptor 116. The request interceptor 116 returns (at block 428) the metadata 312 to the host application 102 submitting the request for metadata 200. If (at block 420) the auto flag 128 indicates auto-playback is "off or if (at block 424) the repository 124 does not include a request record 300$_i$ having metadata for the for the request type 304/data set 306/ subsystem 308/application 310 indicated in the request 200, then a message that the requested metadata is unavailable or fail is returned (at block 430) to the request interceptor 116.

With the embodiment of FIG. 4, the playback controller 122 retains metadata returned from the catalog 120 for a specific request type/data set/subsystem/application in a non-volatile store to allow for metadata for the request type to be retained across system power cycles. If a host application 102 requires the metadata for a subsequent instance of the request, the metadata may be returned from the repository 124 if the data cannot be retrieved from the catalog 120. This is crucial for situations where the catalog 120 is unavailable, such as there is an error in the catalog 120 or the catalog service 118 is unavailable, because host applications 102 may not be able to load or continue without mission critical metadata, such as configuration information on the data sets 106 that need to be accessed. With the described embodiments, the application 102 may continue using data set 102 metadata from the repository 124.

Figure 5:
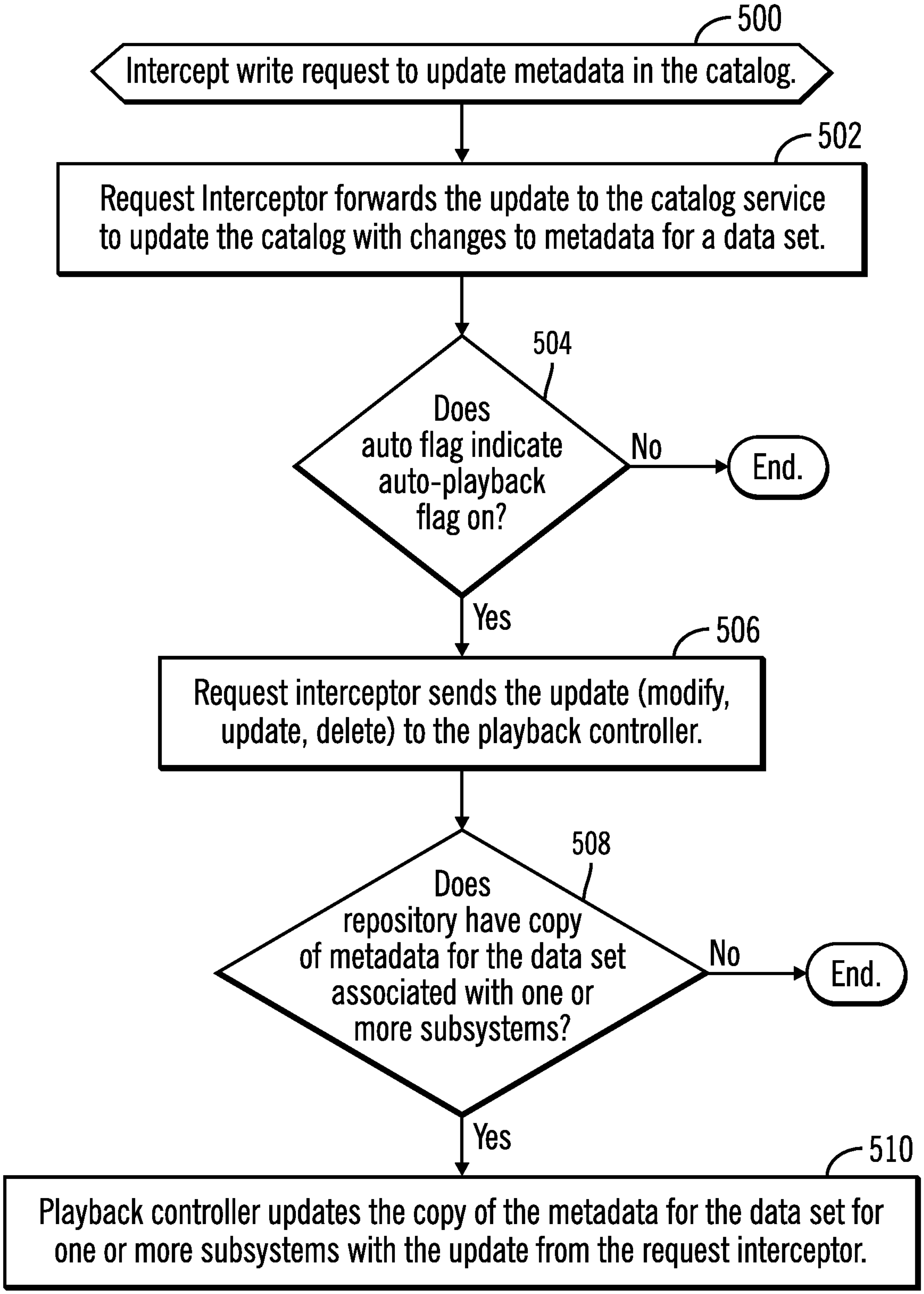
FIG. 5 illustrates an embodiment of operations to update metadata stored for requests in the repository with changes to the metadata in the catalog.

FIG. 5 illustrates an embodiment of operations performed by the request interceptor 116, catalog service 118, and playback controller 122 to process an update to metadata in the catalog 120, which may be in the form of modification, addition, or deletion or whole or in part metadata. Upon receiving (at block 500) the update to metadata, the request interceptor 116 intercepts the request. The request interceptor 116 forwards (at block 502) the update to the catalog service 118 to update the catalog 120 with changes to metadata for a data set 106. If (at block 504) the auto flag 128 indicates auto-playback is "on", then the request interceptor 116 forwards (at block 506) the update to the metadata to the playback controller 122. The playback controller 122 determines (at block 508) whether the repository 124 has a copy of metadata for the data set associated with one or more subsystems. If (at block 508) the repository 124 does have a copy of the metadata, subject to the intercepted update, then the playback controller 122 updates (at block 510) the copy of the metadata 312 in records 300$_i$ for the data set and for one or more subsystems 308 having the data set 306 with the update from the request interceptor 116. The update may involve modifying data, deleting data, or adding data. If (at block 508) the repository 124 does not have a record 300$_i$ with the metadata 312 subject to the update, then control ends. If (at block 504) the auto flag 128 indicates that auto-playback is inactive or "off", then control ends without forwarding the update to the playback controller 122.

In one embodiment, the metadata in the catalog 120 may be updated to indicate a data set is extended into a second volume. In such case, the change to the metadata to indicate extension into a second volume is applied to each record 300$_i$ having the metadata 312 that is subject to the update, so that the repository 124 records 300$_i$ have current metadata. The update to the metadata may only be applied to the metadata 312 in the records 300$_i$ if the change to the metadata relates to the metadata 312 stored in the record 300$_i$, so that only the work area of metadata related to the request type is updated. In this embodiment, metadata in the update unrelated to the metadata 312 maintained for the record 300$_i$ for which the metadata is stored is not applied to the metadata 312 in the record.

With the embodiment of FIG. 5, the repository 124 is updated with changes to metadata stored in the records 300 in the repository so that the metadata in the repository 124 is current and not outdated. This allows the most current version of metadata to be returned from the repository 124 to subsequent requests of the request type 304 for which the metadata is stored. This optimization is important so that metadata returned from the repository 124 has the most current information on the configuration and allocation of extents for the data sets 106.

In one implementation, the repository 124 may be implemented in a partition data set (PDS), such that there is a PDS member for each application 102 or host 100 to manage access to the partition data sets having the records 300 on the metadata. Each PDS member, for an application 102, will have a record for each request type for a data set. In this way, when a request for metadata 200 is received for an application 102, it is copied to the PDS member for the application. In further embodiments, once metadata for a request type is copied to a partition data set, the playback controller 122 will monitor for any changes for metadata stored in the records 300$_i$ so that the metadata in the repository 124 is updated with the changes. Further, only that portion of the metadata returned from the catalog 120 needed for the request type, the returned work area, is saved in the repository 124, not the entire metadata in the catalog 120. Yet further, for a delete, the record 300$_i$, for a request type whose metadata is deleted by the update, is deleted because that metadata is no longer available to return to requests of the request type for which the metadata is stored in the repository 124.

In further embodiments, separate applications 102 may have requests for the same data set, but with slightly different returned work areas or metadata. Each of the records 300$_i$ may contain information that uniquely identifies that specific request type that can be used to verify if an incoming request type 202 matches the stored request type 304. The information identifying a request type may be extracted from a parameter list in the received request 200.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
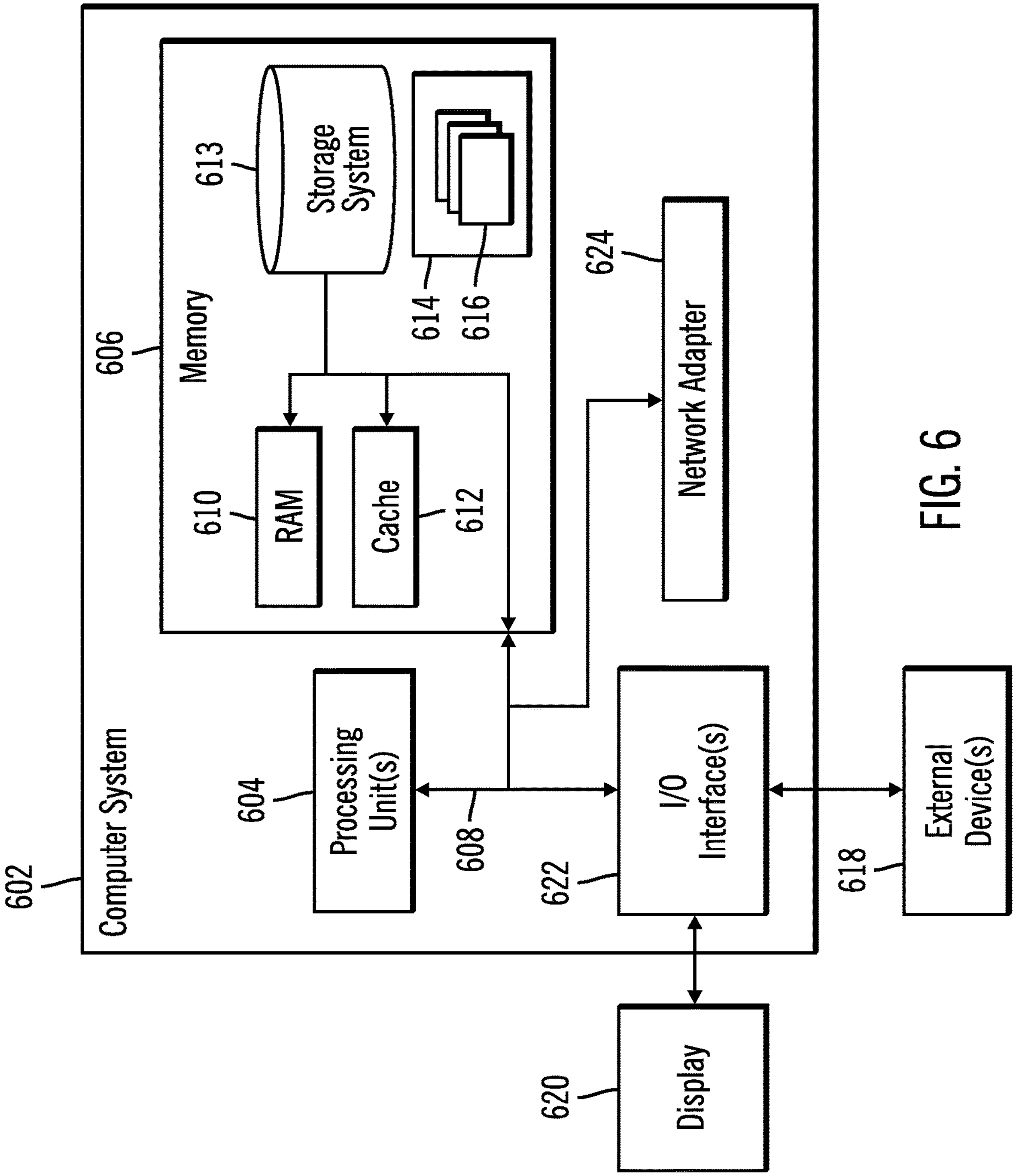
FIG. 6 illustrates a computing environment in which the components of FIG. 1 may be implemented.

The computational components of FIG. 1, including the host 100 and the storage controller 104 may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing Input/Output (I/O) requests for metadata on data sets in storage, wherein the computer program product comprises a computer readable storage medium having computer readable program instructions executed by a processor to perform operations, the operations comprising:

in response to returning metadata, in a catalog storing metadata, to I/O requests, performing:

storing the returned metadata in a repository; and adding a plurality of request records associating metadata in the repository with request types of the I/O requests for which the metadata in the repository was previously returned, wherein a request type identifies a specific command request for the metadata, and wherein the request type and the metadata are indicated in separate fields of the request records;

accessing the catalog to retrieve requested metadata for a received I/O request;

returning the requested metadata for the received I/O request from the catalog in response to accessing the requested metadata from the catalog;

in response to determining that the accessing the requested metadata from the catalog has failed, determining a request record of the plurality of request records indicating a request type of the received I/O request; and returning, to the received I/O request, the metadata in the repository that is indicated in the determined request record for the request type of the received I/O request, wherein the requested metadata is returned from the repository if not accessible through the catalog.

2. The computer program product of claim 1, wherein the operations further comprise:

forwarding an intercepted request to the catalog of metadata; and receiving failure for the intercepted request forwarded to the catalog.

3. The computer program product of claim 1, wherein the operations further comprise:

indicating to retrieve metadata from the repository in an indication field; and submitting the received I/O request to retrieve the requested metadata from the catalog of metadata, wherein the returning the requested metadata for the received I/O request from the repository is performed in response to a failure of the submitting the received I/O request to the catalog and in response to the indication field indicating to retrieve metadata from the repository.

4. The computer program product of claim 1, wherein the request records further associate metadata in the repository with data sets indicated in the I/O requests, wherein the request records associate different metadata with a same request type and with different data sets for submitted request types.

5. The computer program product of claim 1, wherein the operations further comprise:

intercepting an update to metadata in the repository to extend a data set in a first volume into a second volume;

determining that the intercepted update is for a data set associated with metadata in the repository; and updating the metadata for the data set in the repository with the update to the metadata to extend the data set from the first volume to the second volume.

6. The computer program product of claim 1, wherein the request records associate metadata returned for a request type with a data set and a subsystem having the data set, wherein the data set exists in multiple subsystems, and wherein the repository includes metadata for the request type and for the subsystems including the data set, wherein the operations further comprise:

intercepting an update to metadata in a catalog of metadata for the data set in multiple subsystems;

determining request records in the repository that include the metadata for the request type associated with the data set and the subsystems including the data set; and updating the metadata for the data set in the subsystems in the determined request records in the repository.

7. The computer program product of claim 1, wherein the repository includes multiple request records associating instances of metadata with request types of requests for which the metadata was returned from a catalog of metadata and applications that submitted the requests, wherein the request records associate different instances of metadata with a same request type and different applications that submitted the same request type.

8. The computer program product of claim 1, wherein request records indicate for a plurality of applications whether requests for metadata are to be intercepted to determine whether to retrieve the metadata from the repository, further comprising:

intercepting, from an application, a request to access metadata from the catalog in response to determining that at least one application indicated in the intercepted request is indicated in a request record.

9. The computer program product of claim 1, wherein the operations further comprise:

intercepting a change to a catalog of metadata that would change metadata in the catalog;

determining whether the intercepted change to the catalog is for metadata stored in the repository for a request;

writing the changed metadata to the repository to update the metadata stored for the request in the repository in response to determining that the intercepted change is for metadata stored in the repository; and writing the changed metadata to the catalog.

10. A system for processing Input/Output (I/O) requests for metadata on data sets in storage, comprising:

a processor; and a computer readable storage medium having computer readable program instructions that when executed by the processor performs operations, the operations comprising:

in response to returning metadata, in a catalog storing metadata, to I/O requests, performing:

storing the returned metadata in a repository; and adding a plurality of request records associating metadata in the repository with request types of the I/O requests for which the metadata in the repository was previously returned, wherein a request type identifies a specific command request for the metadata, and wherein the request type and the metadata are indicated in separate fields of the request records;

accessing the catalog to retrieve requested metadata for a received I/O request;

returning the requested metadata for the received I/O request from the catalog in response to accessing the requested metadata from the catalog;

in response to determining that the accessing the requested metadata from the catalog has failed, determining a request record of the plurality of request records indicating a request type of the received I/O request; and returning, to the received I/O request, the metadata in the repository that is indicated in the determined request record for the request type of the received I/O request, wherein the requested metadata is returned from the repository if not accessible through the catalog.

11. The system of claim 10, wherein the operations further comprise:

forwarding an intercepted request to the catalog of metadata; and receiving failure for the intercepted request forwarded to the catalog.

12. The system of claim 10, wherein the operations further comprise:

indicating to retrieve metadata from the repository in an indication field; and submitting the received I/O request to retrieve the requested metadata from the catalog of metadata, wherein the returning the requested metadata for the received I/O request from the repository is performed in response to a failure of the submitting the received I/O request to the catalog and in response to the indication field indicating to retrieve metadata from the repository.

13. The system of claim 10, wherein the request records further associate metadata in the repository with data sets indicated in the I/O requests, wherein the request records associate different metadata with a same request type and with different data sets for submitted request types.

14. The system of claim 10, wherein the request records associate metadata returned for a request type with a data set and a subsystem having the data set, wherein the data set exists in multiple subsystems, and wherein the repository includes metadata for the request type and for the subsystems including the data set, wherein the operations further comprise:

intercepting an update to metadata in a catalog of metadata for the data set in multiple subsystems;

determining records in the repository that include the metadata for the request type associated with the data set and the subsystems including the data set; and updating the metadata for the data set in the subsystems in the determined records in the repository.

15. The system of claim 10, wherein the operations further comprise:

intercepting a change to a catalog of metadata that would change metadata in the catalog;

determining whether the intercepted change to the catalog is for metadata stored in the repository for a request;

writing the changed metadata to the repository to update the metadata stored for the request in the repository in response to determining that the intercepted change is for metadata stored in the repository; and writing the changed metadata to the catalog.

16. A method for processing Input/Output (I/O) requests for metadata on data sets in storage, comprising:

in response to returning metadata, in a catalog storing metadata, to I/O requests, performing:

storing the returned metadata in a repository; and adding a plurality of request records associating metadata in the repository with request types of the I/O requests for which the metadata in the repository was previously returned, wherein a request type identifies a specific command request for the metadata, and wherein the request type and the metadata are indicated in separate fields of the request records;

accessing the catalog to retrieve first requested metadata for a received first I/O request;

returning the first requested metadata for the received first I/O request from the catalog in response to accessing the first requested metadata from the catalog;

determining that accessing second requested metadata for a second I/O request from the catalog has failed;

in response to determining that the accessing the second requested metadata from the catalog has failed, determining a request record of the plurality of request records indicating a request type of the received second I/O request; and returning, to the received second I/O request, the second requested metadata in the repository that is indicated in the determined request record for the request type of the received second I/O request, wherein the second requested metadata is returned from the repository if not accessible through the catalog.

17. The method of claim 16, further comprising:

forwarding an intercepted request to the catalog of metadata; and receiving failure for the intercepted request forwarded to the catalog.

18. The method of claim 16, further comprising:

indicating to retrieve metadata from the repository in an indication field; and submitting the received second I/O request to retrieve the second requested metadata from the catalog of metadata, wherein the returning the second requested metadata for the received second I/O request from the repository is performed in response to a failure of the submitting the received second I/O request to the catalog and in response to the indication field indicating to retrieve metadata from the repository.

19. The method of claim 16, wherein the request records further associate metadata in the repository with data sets indicated in I/O requests, wherein the request records associate different metadata with a same request type and with different data sets for submitted request types.

20. The method of claim 16, further comprising:

intercepting a change to a catalog of metadata that would change metadata in the catalog;

determining whether the intercepted change to the catalog is for metadata stored in the repository for a request;

writing the changed metadata to the repository to update the metadata stored for the request in the repository in response to determining that the intercepted change is for metadata stored in the repository; and writing the changed metadata to the catalog.

* * * * *